United States Patent
O'Connor et al.

(10) Patent No.: US 6,961,740 B2
(45) Date of Patent: Nov. 1, 2005

(54) METHOD AND SYSTEM FOR MULTIMODE GARBAGE COLLECTION

(75) Inventors: James M. O'Connor, deceased, late of Monmouth Junction, NJ (US); by Elisa O'Connor, legal respresentative, Monmouth Junction, NJ (US); Aleta Ricciardi, West Windsor, NJ (US)

(73) Assignee: Valaran Corporation, Princeton, NJ (US)

( * ) Notice: Subject to any disclaimer, the term of this patent is extended or adjusted under 35 U.S.C. 154(b) by 184 days.

(21) Appl. No.: 10/209,762

(22) Filed: Aug. 1, 2002

(65) Prior Publication Data

US 2003/0126164 A1 Jul. 3, 2003

Related U.S. Application Data

(60) Provisional application No. 60/309,438, filed on Aug. 1, 2001.

(51) Int. Cl.$^7$ .............................................. G06F 17/30
(52) U.S. Cl. ..................................................... 707/206
(58) Field of Search ...................... 707/206, 10, 103 R; 709/204; 714/4; 719/330; 713/201; 717/101; 345/764

(56) References Cited

U.S. PATENT DOCUMENTS

| | | | | |
|---|---|---|---|---|
| 5,274,809 A | 12/1993 | Iwasaki et al. | ............... | 707/100 |
| 5,384,773 A | 1/1995 | Olnowich et al. | ......... | 370/60.1 |
| 5,617,537 A | 4/1997 | Yamada et al. | ............. | 709/219 |
| 5,963,963 A | * 10/1999 | Schmuck et al. | ........... | 707/205 |
| 5,974,417 A | 10/1999 | Bracho et al. | ................ | 707/10 |
| 6,044,420 A | 3/2000 | Matsunaga et al. | .......... | 710/58 |
| 6,263,338 B1 | 7/2001 | Ronstrom et al. | .......... | 709/100 |
| 6,311,219 B1 | 10/2001 | Factor | ........................ | 709/229 |
| 6,324,495 B1 | 11/2001 | Steinman | ..................... | 703/17 |
| 6,353,898 B1 | 3/2002 | Wipfel et al. | ................. | 714/48 |
| 6,370,566 B2 | 4/2002 | Discolo et al. | ............. | 709/206 |
| 6,381,502 B1 | 4/2002 | Rudder et al. | ................. | 700/2 |
| 6,421,704 B1 | 7/2002 | Waldo et al. | ............... | 709/104 |
| 6,424,872 B1 | 7/2002 | Glanzer et al. | .............. | 700/18 |
| 6,704,756 B2 * | 3/2004 | Wollrath et al. | ............ | 707/206 |
| 6,704,873 B1 * | 3/2004 | Underwood | ................ | 713/201 |

OTHER PUBLICATIONS

Yoo C. Chung, Allocation with Increments in a Non–moving Collector, Nov. 14, 1999, School of Electrical Engineering, Seoul National University, Seoul, Korea, pp. 1–3.*

* cited by examiner

*Primary Examiner*—Diane Mizrahi
(74) *Attorney, Agent, or Firm*—Stuart D. Rudoler (57) ABSTRACT

This invention is a method and system for improved garbage collection in a distributed computing system. Garbage collection is the process of releasing resources that are no longer being utilized by the objects to which those resources are allocated. Specifically, a garbage collection system and method are described that allow for different types of garbage collection to be used at different times and/or on different objects or resources in the system. In the preferred embodiment, the garbage collection routines are contained in separate mobile code module that can be changed dynamically interchanged to provide different garbage collection algorithms.

43 Claims, 4 Drawing Sheets

METHOD AND SYSTEM FOR MULTIMODE GARBAGE COLLECTION

CROSS REFERENCE TO RELATED APPLICATION

The present application claims the benefit of U.S. Provisional Application. 60/309,438 filed on Aug. 1, 2001, the entire disclosure of which is incorporated herein.

BACKGROUND OF INVENTION

This invention generally pertains to managing the allocation and reclamation of computer resources, including computer memory, which is generally know as "garbage collection." In particular, the invention is related to garbage collection in distributed computing systems. Therefore, some background regarding distributed computing systems and techniques is first provided, followed by a description of the background for garbage collection.

Distributed Computing Systems

A distributed system is a collection of autonomous computing entities, hardware or software, connected by a communication medium. While often the computing entities are geographically dispersed, in some instances they might be separate processors in a multi-processor computer or even separate software routines executing in logically isolated memory space on the same computer. A computing entity need not be a traditional computer, but more generally can be any computing device, ranging from a large mainframe to a refrigerator or a cell phone. A distributed application is an application that executes on a distributed system and one in which parts of the application execute on distinct autonomous computing entities.

Whenever a distinct component of a distributed application requests something (e.g., a data value, a computation) of another component, the former is called a client and the latter is called a service. It is worth noting that the terms service and client are not exclusionary in that an item can be both a client and a service. For example, a routine that calculates the time between two events may be a client and of a clock service; if the clock service then calls a routine that converts to Daylight Savings Time, the clock becomes a client and the Daylight Savings Time converter is its service.

Mobile code generally refers to a computer program that can be written on one platform and executed on numerous others, irrespective of differences in hardware, operating system, File system, and many other details of the execution environment. In addition to independence from the physical characteristics of the execution environment, a mobile program may move from one computer to another in the middle of its execution.

Mobile code may be pre-compiled, or compiled when it arrives at the execution platform In the first case, numerous versions of the program must be written and compiled, then matched across run-time environments; this is mobile code in the letter, but not the spirit, of the definition. In addition, the same pre-compiled program cannot move from one platform to a different one during its execution. In the second, the program text may be distributed along with configuration scripts describing what to do in each execution environment. This distributes and delays the specificity of the pre-compiled option. The more interesting, and far more common approach exploits a standard virtual machine, which finesses all the issues of platform heterogeneity. The virtual machine is a program that itself mitigates the machine dependencies and idiosyncrasies, taking the raw program text and compiling it to a binary executable.

Figure 1:
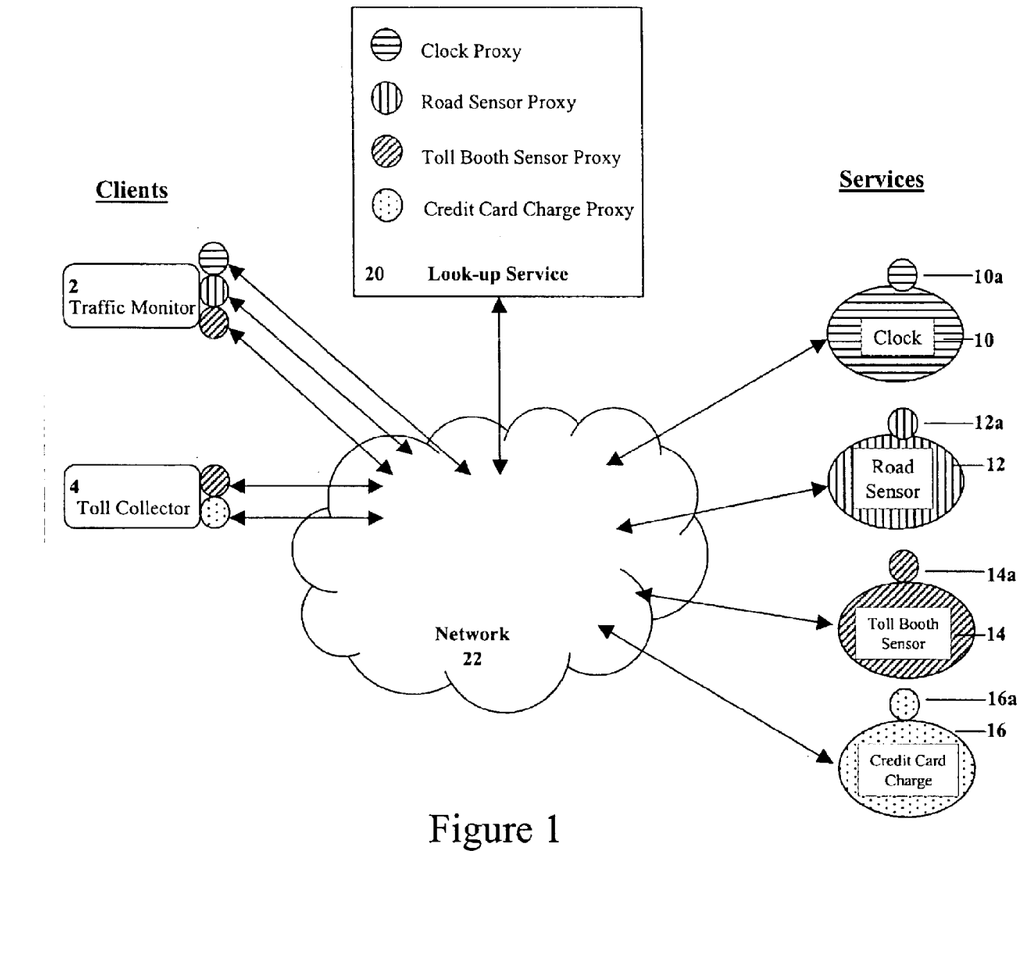
FIG. 1 shows an example of a distributed application of the current invention.

FIG. 1 shows a typical distributed application of the existing art. There are two clients 2, 4 and four services 10, 12, 14, 16 that the clients 2, 4 might need. Each service has a service proxy 10a, 12a, 14a, 16a which is a module of mobile code that can be used by clients to invoke that service. A service proxy 10a, 12a, 14a, 16a contains the code needed by a client 2, 4 to interact with a service. For instance if a service is a digital camera on a robotic arm, the interfaces might include Initialize( ), Zoom( ), Rotate( ) and Get_Picture( ). The service proxy 10a, 12a, 14a, 16a may also provide the expected return values for the service, which might include error codes as well.

In addition to clients 2, 4 and services 10, 12, 14, 16 distributed applications need some mechanism for clients to find services. Often such knowledge is assumed a priori, but many distributed applications use a look-up service. The look-up service 20 is a service with which the other services are registered or advertised to be available for use by clients. In a simple system, where there is no attempt to coordinate replicas of services, each new service registers with the look-up service 20 (in the case of replicas, the onus falls on the client to resolve conflicts and ambiguity). When a services 10, 12, 14, 16 registers, it provides information telling clients 2, 4 how to find it. Commonly, this is a physical location such as an IP address and port number, but in the most modern systems this can be as powerful as giving the look-up service 20 a service proxy 10a, 12a, 14a, 16a, which is mobile code that clients 2, 4 execute and use to invoke the services 10, 12, 14, 16. In this way, the service proxy 10a, 12a, 14a, 16a contains not only location information but instructions for how to use the services 10, 12, 14, 16. While just as necessary for the client 2, 4 as location information, this has generally been assumed as a priori knowledge. When a client 2, 4 wishes to work with a service 10, 12, 14, 16 it locates it through the look-up service 20, downloads the service proxy 10a, 12a, 14a, 16a for that service 10, 12, 14, 16 from the look-up service 20, then uses the service proxy 10a, 12a, 14a, 16a to invoke the service 10, 12, 14, 16. The look-up service 20 may also have attributes of the services 10, 12, 14, 16, such as whether it is a grouped service, what type of group it is, what its cost to use is, how accurate it is, how reliable it is, or how long it takes to execute. In such cases the clients 2, 4 can use the attributes to decide which of a number of services 10, 12, 14, 16 it wishes to use.

Each of the foregoing has access to a communication network 22 so that it is capable of communicating with at least some of the other members in the distributed computing application. The communication network 22 may be wireless, a local area network, an internal computer bus, a wide area network such as the Internet, a corporate intranet or extranet, a virtual private network, any other communication medium or any combination of the foregoing.

In the prior art example shown in FIG. 1, one client 2 is a roadway traffic monitoring program that notifies a user when and where traffic has occurred and the other client 4 is an automated toll collection program. The services are a clock 10, a road sensor 12 that monitors traffic flow on a highway, a toll booth sensor 14 that detects an ID device in each car that passes through the toll, and a credit card charge program 16. When each service 10, 12, 14, 16 becomes available to the application it registers with the look-up service 20 and provides the look-up service with its service proxy 10a, 12a, 14a, 16a.

When the traffic monitoring client 2 begins, it queries the look-up service to see if a clock is available and what sensors are available. The look-up service 20 responds by providing the client 2 with the clock proxy 10a, the road sensor proxy 12a and the toll booth sensor proxy 14a. The traffic monitoring client 2 uses the service proxies 10a, 12a, 14a to invoke the clock 10 and the sensors 12, 14, and then to monitor traffic at various times of the day.

Similarly when the toll collector client 4 begins, it queries the look-up service 20 to see if a toll booth sensor 14 and a credit card charge service 16 are available. The look-up service 20 responds by providing this client 4 with the toll booth sensor proxy 14a and the credit card charge proxy 16a. The toll collector client 4 uses the service proxies 14a, 16a, to invoke the toll booth sensor 14 and the credit card charge program 16, and then to identify cars that pass through the toll booth and charge their credit cards for the toll.

A known technique in the existing art is leasing. A lease is an important concept throughout distributed computing, generally used between a client and service as a way for the service to indicate its availability to the client for a length of time. At the end of the lease, if the lease is not renewed, there is no guarantee of availability. In a simple example, a service may register with a look-up service and be granted a lease for five minutes. This means that the lookup service will make itself available to the service (i.e., list it) for five minutes. If a camera grants a lease to a client for two minutes, then that client will be able to position, zoom, and take pictures for two minutes. There are a wide variety of ways to handle lease negotiation, renewal and termination which are well known to those skilled in the art of distributed computing and all such methods are meant to be incorporated within the scope of the disclosed invention. A detailed explanation of leases can be found in, Jim Waldo, *The Jini Specification, 2nd Edition*, chapter LE (2001), which is incorporated herein by reference.

One useful aspect of leases is that they can be used for simple failure detection. If the expectation is that a client will continue to request lease renewal from a service, but then does not renew its lease, the service may assume that the client has failed, or is otherwise unavailable This allows the service to more efficiently manage its own resources, by releasing any that were dedicated to expired clients.

This is especially important because components only rarely plan and announce their failure and are not able to predict network outages. It is far more common that failures and outages are unexpected, and that the consequence is an inability to announce anything. In these cases, a client will not renew its lease so that eventually, the granting service will reallocate its resources. The shorter the lease period, the sooner a failure can be detected. The tradeoff is that both client and service spend proportionately more time and resources dealing with leasing.

Jini is one example of a commercially available specification for a distributed object infrastructure (or middleware) for more easily writing, executing and managing object-oriented distributed applications. Jini was developed by Sun Microsystems and is based on the Java programming language; consequently, objects in a Jini system are mobile. Jini is described in Jim Waldo, *The Jini Specification, 2nd Edition* (2001). The Common Object Request Broker Architecture (CORBA), developed by the Object Management Group, and Distributed Component Object Module (DCOM), developed Microsoft Corporation, are two other commercially available examples that are well known in the prior art. Jini, DCOM, CORBA and a number of other distributed computing specifications are described by Benchiao Jai et al., *Effortless Software Interoperability with Jini Connection Technology*, Bell Labs Technical Journal, April–June 2000, pp. 88–101, which is hereby incorporated by reference.

Garbage Collection

In modern computer systems, regardless of whether they are distributed or centralized, resources are allocated to an object when it is instantiated, and in some cases later during the object's existence if the object requests additional resources. Typically the resource is computer memory, but it may also include other needed system resources such as disk space, processing power or communication bandwidth. In many instances, once the resources are allocated to an object no other object can use this resource until the first object releases (or does not renew) the resource, regardless of whether or not the first object is actually using the resource. For example, if a particular block of memory is allocated for an object to execute in, no other object can use this memory space. In other circumstances, multiple objects may use a single resource, but there may be a limit to the amount of that resource available. For instance, a communication channel with 20 Mb of bandwidth may guarantee 8 Mb of bandwidth to two different objects, but when a third object requests another 8 Mb, the request should be denied.

In the ideal world, each object would release resources either when it finishes execution or when it will not be needing a particular resource for an extended period of time. Unfortunately, many objects are not "well behaved" and fail to appropriately release resources. Even well behaved programs sometimes crash or hang before they can release their resources. This is why leasing, described above as a failure detection mechanism, can be used as the trigger for garbage collection to begin. This problem is further complicated in distributed applications where the communication channel between an object and a resource may be interrupted, thereby preventing the object from releasing the resource, or causing the resource to believe the object has crashed.

Resource allocation is the process by which portions of resources are reserved for objects in a computer system to use. Garbage collection is the process by which these reserved resources are "freed up", or deallocated so that other objects can use them.

The problem of unused resources not being freed is familiar even to many casual personal computer users. Many times a personal computer will indicate that it has low or insufficient memory, even though the user has no software other than the operating system running. The common way to solve this problem is to reboot the computer, which frees all resources from all objects and restarts the computer from a pure state. This (not very optimal) way of performing garbage collection penalizes all objects rather than just those responsible for hogging memory.

One problem inherent is garbage collection is that a resource may be released when the object is still expecting it to be there. At best this will cause the object to have to reacquire the needed resource, but it may also cause a less robust object to report an error or to crash. For example, a straightforward garbage collector may be programmed to free any resource that has not been used for more than sixty seconds. Now consider that an object may not be able to call a resource for longer than that time because its communication link is down, but that the object is still invoking and queuing calls to the resource. When the communication link is re-established, the object will send the calls to a resource that is no longer available to it, causing the object to fail, or perhaps even causing conflicts and incorrect behavior for the resource. On the other hand, if the garbage collector waits for five minute of inactivity to free up the resource, that resource may go underutilized causing other objects to delay or block because they cannot access that resource. Thus tension exists between the "aggressiveness" of the garbage collector, and the goal of ensuring that objects have the resources they expect. Garbage collection for a scarce resource may be more aggressive, while it would be less aggressive where reliability is of greater concern. Different garbage collection algorithms are optimized for different types of applications, and may be further tuned to make them more or less aggressive. For instance, in the simple algorithm described above, the lapse time could be varied to make the garbage collector more or less aggressive.

One means of garbage collection is reference counting. Each object has a reference, or a pointer, to each resource that it uses. The garbage collection routine can monitor the number of references to each resource and free up the resource when there are no longer any references. This method tends to work best in localized (non-distributed) applications where a single operating system can monitor the references. It is difficult for a remote routine to monitor references on another computer accurately and in a timely manner; specifically, a communication lapse may cause the garbage collector to believe the reference is gone.

Leasing, a technique describe above, is an effective method of garbage collection. When the lease ends the resource is released, unless the lease has been renewed. Such a use of leasing is described in U.S. Pat. No. 5,832,529 to Wollrath et al., entitled "Methods, Apparatus, and Product for Distributed Garbage Collection."

Another known technique for garbage collection is for the garbage collector or a resource to "ping" the object (or objects) using a resource at fixed intervals. A response to the ping from the object indicates that the object is operating—it has not crashed or hung and the network connection to it is viable. One problem with this method is the amount of non-useful communication injected in the network; another problem is that it requires reliable two-way communication in order to maintain the object's liveness.

Another known technique for garbage collection is last reference time stamp. In this technique, a period of time is allocated to each object that uses a resource. If the object does not use that resource (e.g., no calls are received by the resource from that object) within the time period, the resource is released from that object.

One problem with the current forms of garbage collection is that they use a constant algorithm. However at different times, or under different ambient conditions, or even (in the case of shared resources) for different requesting objects, different types of algorithms may be appropriate. During periods of high contention for a resource, an aggressive algorithm might be desirable. When the system is having network communication problems, a less aggressive algorithm might be desirable. When a resource is highly shared (i.e., has many concurrent users) leasing may be preferable, whereas when it is lightly shared reference counting, while globally less efficient, would be acceptable with the accompanying benefits of improved accuracy. Current garbage collection systems do not allow for such variation.

Another restriction is that garbage collection is currently conducted by a specific garbage collection system which examines each resource according to the previously described algorithms, and decides whether or not to recall them. Resources do not garbage collect themselves when they detect they are no longer needed.

It is therefore an object of the present invention to provide a method of garbage collection that can dynamically switch between different garbage collection algorithms.

It is a further object of the present invention to provide a method of garbage collection in which the parameters of a given algorithm can be dynamically modified.

It is a further object of the present invention to provide a method of garbage collection wherein the garbage collection algorithms are written as separate mobile code objects.

It is a further object of the present invention to provide a method of garbage collection wherein resources can garbage collect themselves according to various and numerous criteria.

BRIEF DESCRIPTION OF THE INVENTION

This invention is a method and system for improved garbage collection in a distributed computing system. Garbage collection is the process of releasing resources that are no longer being utilized by the objects to which those resources are allocated. Specifically, a garbage collection system and method are described that allow for different types of garbage collection to be used at different times and/or on different objects or resources in the system. In the preferred embodiment, the garbage collection routines are contained in separate mobile code modules that can be changed dynamically interchanged to provide different garbage collection algorithms.

DETAILED DESCRIPTION OF THE INVENTION

The invention is a method wherein a garbage collection system can employ a plurality of modes of garbage collection for resources, dynamically tune these modes, and dynamically change the mode used for a resource. In one embodiment of the invention a resource can become its own garbage collector. This allows the distributed system to be adjusted so as to optimize the efficiency of garbage collection algorithms, and to minimize the execution and network costs incurred by global garbage collection.

In the simplest embodiment of the invention the distributed computing system uses the same type of garbage collection throughout the system. Upon some event the method of garbage collection is switched dynamically from one type to another across the distributed system. There may be two, three or more algorithms available to switch between. The event that causes the switch may be a signal sent by a system supervisor (human or automated), the time of day, or reaching a certain level of free system resources.

The garbage collection algorithms can be any of the existing algorithms described in the background discussion above, or some other algorithm whether currently known or developed hereafter.

In a more complex embodiment of the invention different resources may be garbage collected according to different garbage collection algorithms. Here too, each resource's garbage collection routine can be switched from one algorithm to another. This can either be done globally or for different resources at different times.

In another more complex embodiment of the invention, garbage collection for a shared resource may use different algorithms for each object using the resource. These algorithms, too, can be switched.

In addition to (or instead of) the garbage collection algorithms being switched in any of the aforementioned embodiments, they may be tuned dynamically by adjusting certain parameters. For instance if an algorithm uses a weighting mechanism that it applies to various references, the weights may be adjusted. Similarly, the allowable time of inactivity can be increased or reduced. As before, such dynamic adjustments can be performed automatically or through human intervention. As before, such dynamic adjustments can be performed system wide, with respect to a subset of resources, or with respect to a subset of objects.

The term dynamically, whether applied to switching or tuning a particular garbage collection algorithm, means that the change occurs without disabling or otherwise interrupting the objects currently using the resource, or interrupting the larger distributed application composed of these objects and resources.

Figure 2:
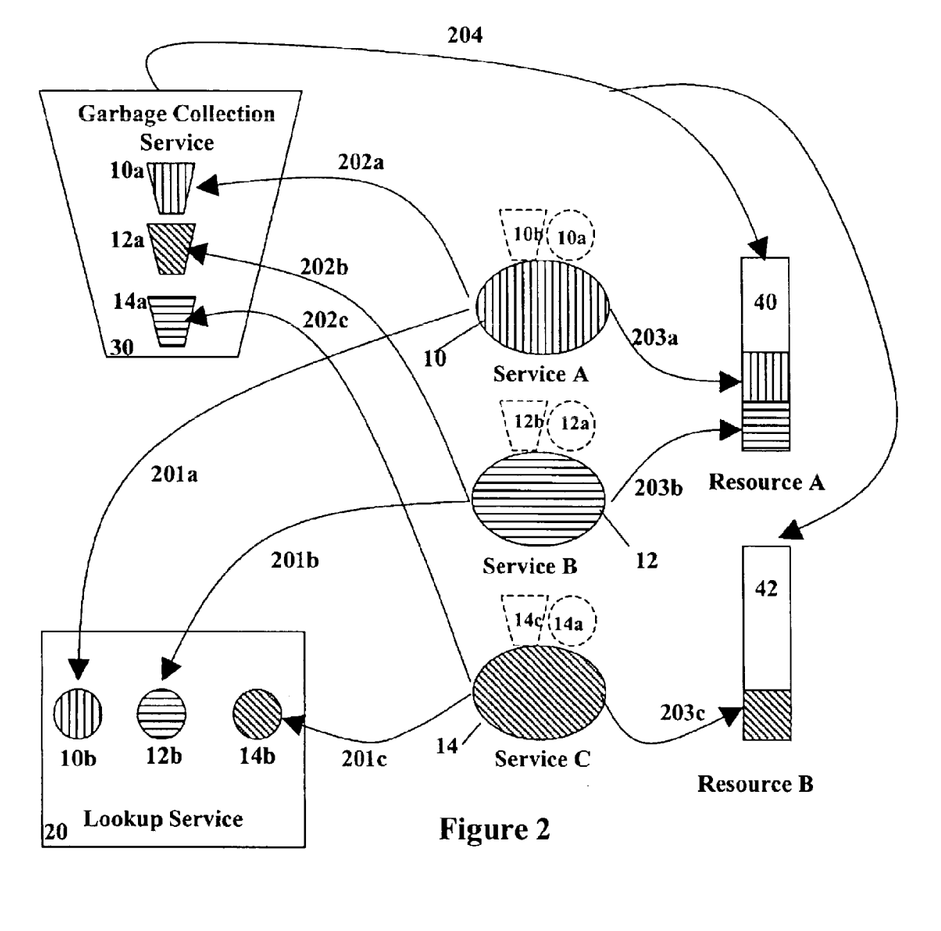
FIG. 2 shows an embodiment of the invention utilizing a specialized garbage collection service.
Figure 3:
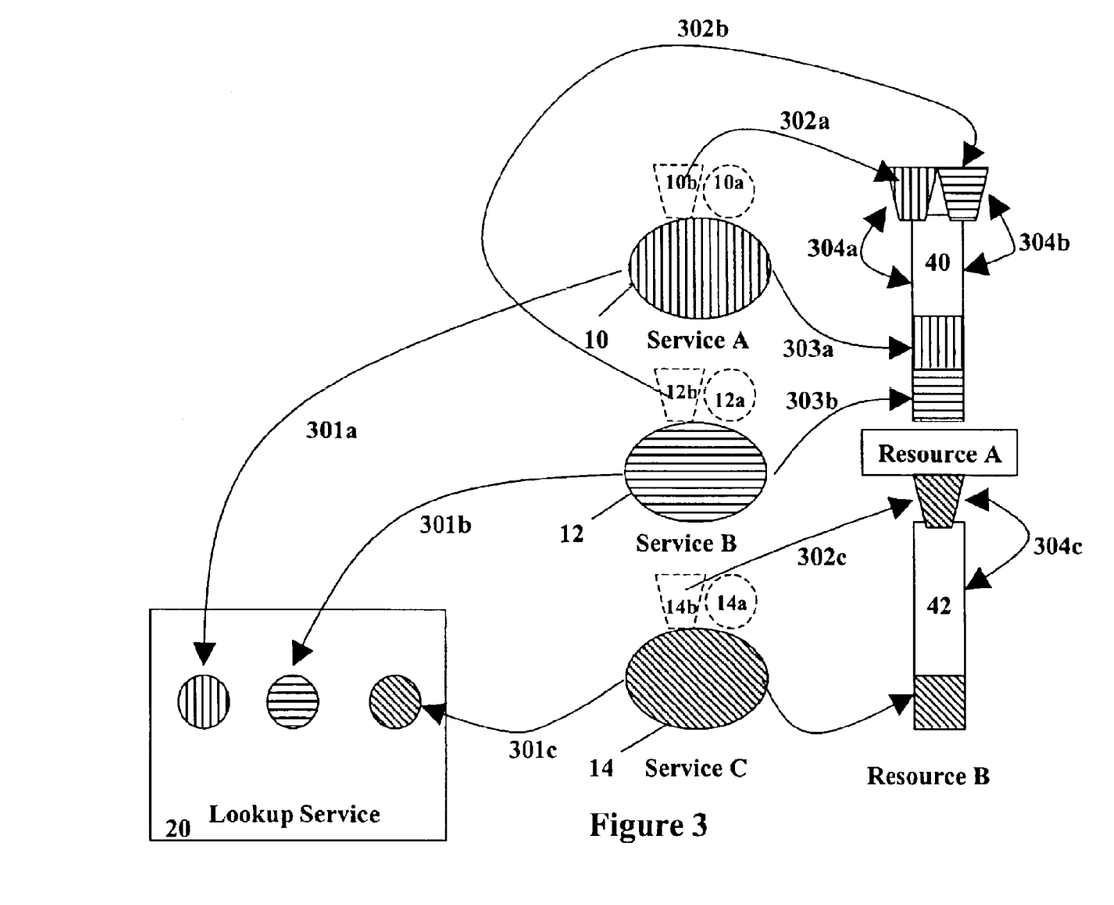
FIG. 3 shows an embodiment of the invention wherein garbage collection agents are executed by resources or its host.

The invention also allows for numerous methods of accessing the various garbage collection algorithms. In one embodiment, the garbage collection algorithms are hard coded into each resource's software. In another embodiment, the garbage collection algorithms are supplied, maintained, and executed by a distinct garbage collection service. However, in the preferred embodiment of the invention each object using a resource provides a separate software module that handles garbage collection. This will be termed the garbage collection agent. The garbage collection agent can be provided to a garbage collection service or to the resource itself. In the latter case, the garbage collection agent is run as a background task to the resource's main task, so that it may be shut off and swapped out without interrupting the resource. FIG. 2 shows garbage collection agents executing as part of a garbage collection service, while FIG. 3 shows them executing as part of the resource. Alternately (not shown in any figure), the garbage collection agents can execute as independent free standing objects within the distributed application.

While in the previous description the resource has been described as running, in certain circumstances, its own garbage collection routine, in some implementations the garbage collection routine may be run by the hardware/software that hosts the resource or any number of resources. This will be described as the "resource host", and any reference herein to interaction with a resource is meant to include the resource host. The resource host handles interactions with the resource and the objects requesting the resource including allocating and partitioning the resource. In many cases the resource host will be the operating system for the computing device on which the resource can be found.

FIG. 2 shows a preferred embodiment of the invention. In this embodiment there is a garbage collection service 30 which performs garbage collection across the distributed application. It is worth noting that local and system wide garbage collection are not exclusive of each other; they may be integrated. For example some particular resources may be subject to local garbage collection schemes, while other resources on the same host are subject to the distributed garbage collection service. Alternatively, a distributed application (one that is implemented over multiple, distributed computers) could have multiple levels of garbage collection, one at the physical resource level and one at the distributed application level.

Each service has a proxy 10a, 12a, 14a which it registers 201a–c with a lookup service 20 when the service is instantiated. The proxies 10a, 12a, 14a are used by clients (not shown) to call the services 10, 12, 14. Each service also has one or more garbage collection agent 10b, 12b, 14b that is optimized to free resources allocated to and utilized by that service.

The garbage collection agent is a module of mobile code that can be transferred from one object to another. It may consist of different garbage collection algorithms, the same algorithms, or the same algorithms with different parameters. In one embodiment the garbage collection agent is comprised of pointer to the desired algorithm and the agent can be modified simply by changing the pointer.

Continuing in FIG. 2, when the services 10, 12, 14 enter the distributed environment, in addition to providing the lookup service 20 with their proxies 201a–c, 10a, 12a, 14a, they also provide the garbage collection service 30 with their garbage collection agents 202a–c, 10b, 12b, 14b. Alternatively, the services 10, 12, 14 may wait until they utilize resources 40, 42 to provide the garbage collection service 30 with their garbage collection agents 10b, 12b, 14b.

Each service utilizes certain resources 40, 42. As a service requires resources it negotiates 203a–c with each resource host for the appropriate allocation of the resource. These techniques of allocating resources are well known and will not be further described. As shown in FIG. 2 multiple services 10, 12 may use a single resources 40 and (not shown) a single service may use multiple resources.

The garbage collection service 30, having received the garbage collection agent 10b, 12b, 14b monitors 204 the services 10, 12, 14 and resources 40, 42 according to the algorithm in each agent, and when necessary releases the portions of a resource that have been abandoned. The garbage collection service may do this by instructing the resource host to release a portion of the resource, or it may set a flag so that the resource host knows to release that portion of the resource.

FIG. 3 shows a similar process for a system that does not utilize a garbage collection Service, but instead of each resource host handles garbage collection for its resource. In this embodiment the services 10, 12, 14 provide 302a–c their garbage collection agents 10b, 12b, 14b directly to the resources 40, 42, and the resource host (not shown) handles the task locally of monitoring 304a–c and releasing unused portion of the resource. As in FIG. 2, services 10, 12, 14 provide 301a–c their proxies 10a, 10b, 10c to the lookup service 20 and negotiate 302a–c for allocation of resources 40, 42.

While in the previous description only services used resources, all objects, including clients may utilize resources and have garbage collection agents. From the perspective of a client, a service is a resource. Also, objects may have multiple garbage collection agents. An object may have different garbage collection agents for different types of resources, or it may have different types of agents for different circumstances.

Figure 4:
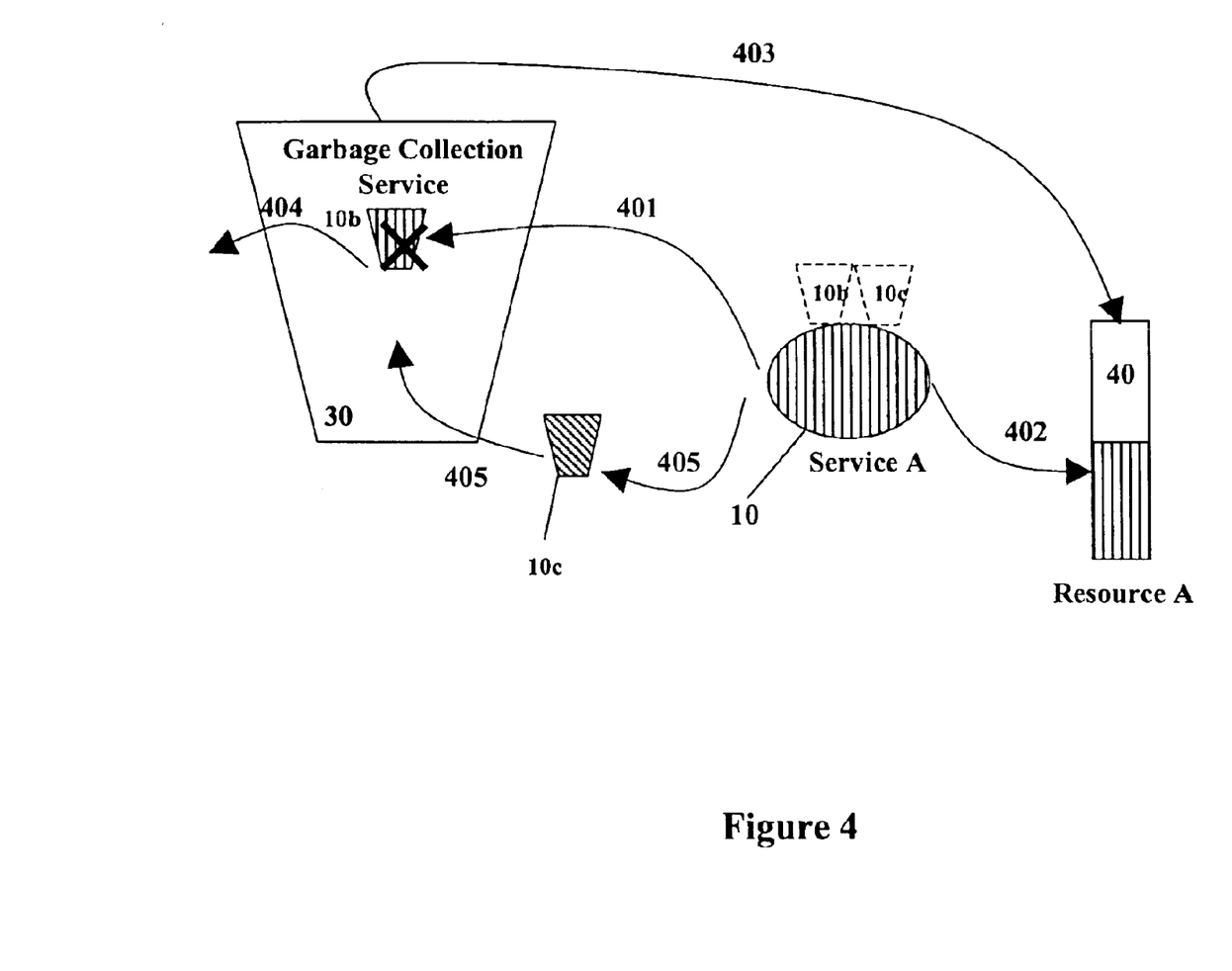
FIG. 4 shows two garbage collection agents being interchanged.

FIG. 4 shows a service 10 with multiple garbage collection agents 10b, 10c, that swaps the agents out of depending on conditions. In this example, it has two different agents: an ordinary garbage collection agent 101b and a high reliability agent 10c (i.e. very lax in collecting resources). At first the service 10 provides the garbage collection service 30 with its ordinary garbage collection agent 10b, 401. The service 10 also requests and receives an allocation of a resource 40, 402. The garbage collection service 30 uses the average garbage collection agent 10b to monitor and garbage collect the resource 40, 403. At some later time, the service 10 finds that it is experiencing a high number of errors due to loss of the resource allocated to it. The service 10 (or, alternatively, a human operator or the garbage collection service) concludes that the resource is being lost too often because of the garbage collection agent 10b. It therefore decides to switch to the high reliability garbage collection agent 10c. The service 10 does this by deleting the ordinary garbage collection agent 10b, 404 from the garbage collection service 30 and providing the high reliability garbage collection agent 10c to the garbage collection service 30, 405. The garbage collection service now continues to monitor the resource 40 with the new garbage collection agent 10c, 403. At another time when resources become scarce, the service may switch to a third garbage collection agent (not shown) which seeks to optimize available resources by being more aggressive. In an alternative embodiment, instead of switching the garbage collection agent, the service might simply adjust the parameters in the existing agent.

Certain garbage collection agents may be optimized for different environments such as one with unreliable communication.

In an alternative embodiment instead of swapping agents, the service merely updates certain parameters in the garbage collection agent, such as the delay time, while the garbage collection agent is still in at the garbage collection service or resource.

It has been assumed thus far that the services know how to operate with the garbage collection agent and garbage collection service. However, this is not always the case, especially for legacy services. However, services can be provided with a proxy for the garbage collection service, or some other shell or code module, that handle all of the garbage collection operations on behalf of the service.

In and alternative embodiment instead of (or in addition to) services providing their own garbage collection agent, agents may be provided by clients or resource hosts.

In another embodiment of the invention the objects using the resource (the services in FIGS. 2 and 3) may not be the entity selecting and controlling the garbage collection agents. The garbage collection agents might be stored in and selected by the garbage collection service. Alternatively, the garbage collection agent might be provided by the resources themselves, or by the system architect/operator (i.e. through human intervention at such time). It will be obvious to those skilled in the art of mobile code and distributed computing that the garbage collection task can be split into multiple modules or combined. For instance, there need not be a single garbage collection service and each garbage collection agent may act as its own independent object to monitor certain resources.

In an object oriented system, services are resources to the clients that use them. They provide functionality to a client that it does not natively possess. Implicitly, a service reserves and allocates a portion of its available functionality to a client whenever it responds to a method invocation; should the client fail, the reserved capability must be reclaimed. Conversely, when the service fails, resources that have been allocated to it must be reclaimed; in addition to the usual operating system resources such as processor priorities and memory, these include temporary files and storage, resources it has claimed from other services, and any software connecting clients to that service (e.g., client-side proxies in a Jini-based system).

In modem object oriented systems, applications execute in containers which manage things like security policies, load balancing, and session logic. The container is, in the language developed earlier, a resource host for the application. This invention provides a method by which a container can implement multi-mode distributed garbage collection for the applications it is hosting. When the container detects an application's failure, it can notify clients (or a failure detection service) to discard their proxies to the service, and it can notify resources that this particular application was using so that they can reclaim the portions allocated to this application. That is, the resource host can instigate both client-side and resource-side garbage collection.

It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

What is claimed is:

1. A method of garbage collection in a computer system comprising the steps of:

using a first algorithm for garbage collection of at least one resource;

detecting an event indicating that a different algorithm should be used; and switching to a second algorithm for garbage collection of the at least one resource;

wherein the first and second algorithms for garbage collection are selected from the group consisting of reference counting, pinging, time since last use, expired time-to-live, last reference time stamp and leasing.

2. The method of claim 1 wherein the switching is accomplished while the at least one resource is operating.

3. The method of claim 1 wherein the garbage collection algorithms are executed by a resource host.

4. The method of claim 1 wherein the garbage collection algorithms are executed as part of garbage collection service.

5. The method of claim 1 wherein the computer system is a distributed computing system.

6. The method of claim 1 wherein the resource is memory, computational power, a central processing unit, a lookup service, a hardware device, a software module, a service, a container, a client or a communication channel.

7. The method of claim 1 wherein the event is the availability of a resource, errors in the system, time of day, length of time, a signal from a human operator, a request by an object in the system, or the addition or removal of another resource.

8. The method of claim 1 wherein the step of switching to a second algorithm is accomplished by changing the parameters in the first algorithm.

9. A computer readable medium containing instructions for controlling a computer system to perform a method of garbage collection in a computer system, the method comprising the steps of:

using a first algorithm for garbage collection of at least one resource;

detecting an event indicating that a different algorithm should be used;

and switching to a second algorithm for garbage collection of the at least one resource;

wherein the first and second algorithms for garbage collection are selected from the group consisting of reference counting, pinging, time since last use, expired time-to-live, last reference time stamp and leasing.

10. The computer readable medium of claim 9 wherein the switching is accomplished while the at least one resource is operating.

11. The computer readable medium of claim 9 wherein the garbage collection algorithms are executed by a resource host.

12. The computer readable medium of claim 9 wherein the garbage collection algorithms are executed as part of garbage collection service.

13. The computer readable medium of claim 9 wherein the computer system is a distributed computing system.

14. The computer readable medium of claim 9 wherein the resource is memory, computational power, a central processing unit, a lookup service, a hardware device, a software module, a service, a container, a client or a communication channel.

15. The computer readable medium of claim 9 wherein the event is the availability of a resource, errors in the system, time of day, length of time, a signal from a human operator, a request by an object in the system, or the addition or removal of another resource.

16. The computer readable medium of claim 9 wherein the step of switching to a second algorithm is accomplished by changing the parameters in the first algorithms.

17. A method of garbage collection in a distributed computing application comprising the steps of:
providing at a first garbage collection agent; and
replacing the first garbage collection agent with a second garbage collection agent;
wherein the first garbage collection agent and the second garbage collection agent implement different algorithms for garbage collection for a resource and said algorithms are selected from the group consisting of reference counting, pinging, time since last use, expired time-to-live, last reference time stamp and leasing.

18. The method of claim 17 wherein the garbage collection agents are executed by a resource host for the resource.

19. The method of claim 17 wherein the garbage collection agents are executed by a garbage collection service.

20. The method of claim 17 wherein the resource is memory, computational power, a central processing unit, a lookup service, a hardware device, a software module, a service, a container, a client or a communication channel.

21. The method of claim 17 wherein the first garbage collection agent and second garbage collection agent are swapped upon the occurrence of an event.

22. The method of claim 21 wherein the event is the availability of a resource, errors in the system, time of day, length of time; a signal from a human operator, a request by an object in the system, or the addition or removal of another resource.

23. The method of claim 17 wherein at least one of the garbage collection agents are provided by a service that uses the resource.

24. The method of claim 17 wherein there are a plurality of services using the resource and each service provides its own garbage collection agent.

25. A computer readable medium containing instructions for controlling a computer system to perform a method of garbage collection in a distributed computing application, the method comprising the steps of:
providing at a first garbage collection agent; and
replacing the first garbage collection agent with a second garbage collection agent;
wherein the first garbage collection agent and the second garbage collection agent implement different algorithms for garbage collection for a resource and said algorithms are selected from the group consisting of reference counting, pinging, time since last use, expired time-to-live, last reference time stamp and leasing.

26. The computer readable medium of claim 25 wherein the garbage collection agents are executed by a resource host for the resource.

27. The computer readable medium of claim 25 wherein the garbage collection agents are executed by a garbage collection service.

28. The computer readable medium of claim 25 wherein the resource is memory, computational power, a central processing unit, a lookup service, a hardware device, a software module, a service, a container, a client or a communication channel.

29. The computer readable medium of claim 25 wherein the first garbage collection n agent and second garbage collection agent are swapped upon the occurrence of an event.

30. The computer readable medium of claim 29 wherein the event is the availability of a resource, errors in the system, time of day, length of time, a signal from a human operator, a request by an object in the system, or the addition or removal of another resource.

31. The computer readable medium of claim 25 wherein at least one of the garbage collection agents are provided by a service that uses the resource.

32. The computer readable medium of claim 25 wherein there are a plurality of services using the resource and each service provides its own garbage collection agent.

33. A distributed computing system comprising:
a plurality of computing devices;
a resource;
a service utilizing a portion of the resource; and
a garbage collection agent that monitors the resource and releases the portion of the resource used by the service;
wherein the garbage collection agent is comprised of an algorithm for garbage collection selected from the group consisting of reference counting, pinging, time since last use, expired time-to-live, last reference time stamp and leasing.

34. The system described in claim 33 further comprising a garbage collection service that operates the garbage collection agent.

35. The system described in claim 34 further comprising a plurality of services each with a separate garbage collection agent.

36. The system described in claim 35 further comprising a plurality of resources each with a separate garbage collection agent.

37. The system described in claim 36 further comprising a plurality of garbage collection agents wherein at least two of the agents are switched to accomplish different garbage collection algorithms.

38. The method of claim 37 wherein switching happens upon the occurrence of an event.

39. The method of claim 38 wherein the event is the availability of a resource, errors in the system, time of day, length of time, a signal from a human operator, a request by an object in the system, or the addition or removal of another resource.

40. The system described in claim 33 wherein the garbage collection agent is comprised of a garbage collection algorithm and a parameter wherein the parameters can be modified.

41. The system described in claim 33 further comprising a resource host for controlling allocation of portions of the resource to the service and for receiving instructions from the garbage collection agent to release portions of the resource.

42. The system described in claim 33 wherein the garbage collection agent is executed by the resource host.

43. The method of claim 33 wherein the resource is memory, computational power, a central processing unit, a lookup service, a hardware device, a software module, a service, a container, a client or a communication channel.

* * * * *